(12) United States Patent
Mathiesen et al.

(10) Patent No.: US 8,179,817 B2
(45) Date of Patent: May 15, 2012

(54) TOOL FOR COMMUNICATION SYSTEM

(75) Inventors: Mogens Mathiesen, Oslo (NO); Niels Aakvaag, Hosle (NO); Robert Martinez, Asker (NO)

(73) Assignee: ABB Research Ltd., Zürich (CH)

( * ) Notice: Subject to any disclaimer, the term of this patent is extended or adjusted under 35 U.S.C. 154(b) by 250 days.

(21) Appl. No.: 11/979,335

(22) Filed: Nov. 1, 2007

(65) Prior Publication Data

US 2009/0003230 A1 Jan. 1, 2009

(30) Foreign Application Priority Data

Nov. 1, 2006 (EP) .................................. 06123319

(51) Int. Cl.
*H04L 12/28* (2006.01)
(52) U.S. Cl. ........................ 370/254; 370/252
(58) Field of Classification Search .................. 370/252, 370/254–5
See application file for complete search history.

(56) References Cited

U.S. PATENT DOCUMENTS

| | | | | |
|---|---|---|---|---|
| 6,973,622 B1 * | 12/2005 | Rappaport et al. | ............ | 715/735 |
| 7,055,107 B1 * | 5/2006 | Rappaport et al. | ............ | 715/848 |
| 7,295,960 B2 * | 11/2007 | Rappaport et al. | ............ | 703/13 |
| 7,379,829 B2 * | 5/2008 | Dundar et al. | ............ | 702/57 |
| 2004/0260408 A1 * | 12/2004 | Scott et al. | ............ | 700/20 |

FOREIGN PATENT DOCUMENTS

| | | |
|---|---|---|
| EP | A-0 495 305 | 7/1992 |
| EP | 1087273 A | 3/2001 |
| EP | 1534032 A1 | 5/2005 |
| WO | WO-98/24016 A2 | 6/1998 |
| WO | WO-2004/057430 A1 | 7/2004 |
| WO | WO-2004/086824 A1 | 10/2004 |

OTHER PUBLICATIONS

OPNET Technologies, Inc; Opnet Wireless Module; 2005, 3 pages.
European Search Report—Apr. 27, 2007.
European Patent Office Communication, dated Oct. 9, 2009, issued in connection with counterpart European Application No. 06 123 319. 3—2206.

* cited by examiner

*Primary Examiner* — Derrick Ferris
*Assistant Examiner* — Peter Cheng
(74) *Attorney, Agent, or Firm* — Venable LLP; Eric J. Franklin

(57) ABSTRACT

A method for designing an, at least partly wireless, local area communication network for industrial application. A 3D plant model of the area in which the communication network is to operate is accessed. Devices that are to communicate in the communication, identify and quantify potential sources of interference or attenuation of the communication signals are introduced into this model. Data regarding communication characteristics of the devices are included. Communication possibilities of the devices are tested and evalutated in the communication network taking into account the possible interference and attenuation sources. If communication possibilities of a particular device is inadequate, adjustments regarding that device are suggested.

12 Claims, 2 Drawing Sheets

TOOL FOR COMMUNICATION SYSTEM

CROSS-REFERENCE TO RELATED APPLICATIONS

This application claims priority to European patent application 06123319.3 filed 1 Nov. 2006.

TECHNICAL AREA

The present invention relates to a tool for aiding engineers in designing and evaluating wireless systems for use in an industrial automation application.

TECHNICAL BACKGROUND

Most industrial plants of today are provided with control systems for controlling and monitoring of a plurality of functions, processes, production steps and the like via field devices comprising sensors, detectors, PLCs, control units, drive units etc. Thus a communication infrastructure needs to be present in the plant for enabling the data and information communication between the different field devices of the control system. The control systems aid the personnel responsible for the plant to ensure its operation and to optimize the process. In these types of systems often closed loop control is used, whereby the control system sends signals to for example a drive unit to change its motor speed, which motor speed is sensed by a sensor that sends a signal of the actual speed back to the control system.

The communication is enabled with industrial process control systems, such as for example the IT System 800xA from ABB. Such communication contains a wired fieldbus infrastructure where a large number of field devices can be connected and controlled. The system can utilize a number of field bus communication protocols such as Foundation, HART and Profibus.

During a number of years the trend in communication has been to go from wired to wireless communication systems, and there is a similar, but more recent, trend also in industrial process applications. A few wireless field devices and control units have been developed and also the process communication protocols have been developed to handle wireless communication.

Even if wireless communication in many applications simplify the setup of a process control system in that much less wiring is needed, and it is also less complicated to add field devices without having to fit new wiring in existing systems, wireless communication also place higher demands on the engineering tools & methods used for industrial automation applications. One aspect is that the wireless communication often is inferior to wired communication. There could be a number of interference and attenuation sources that may affect the quality of the wireless signals, resulting in packet loss, variable time delay, radio interference and other stochastic behaviour that will directly influence the quality and stability of the controlled processes. Thus, in order to take advantage of wireless communication systems between field devices and controllers, the stability of the end system has to be ensured. In order to do this the communication topology must be co-engineered with the 3-dimensional (3D) plant layout or topology and the control system.

This engineering task is very time-consuming and difficult due to the amount of communication and control theory involved and to the iterative nature of the problem.

BRIEF DESCRIPTION OF THE INVENTION

The aim with the present invention is to remedy the above mentioned problem and to facilitate the setting up of wireless systems in industrial applications.

According to a main aspect of the invention it is characterised by a method for designing a, at least partly wireless, local area communication network for industrial application, comprising the steps of: using an existing 3D plant model of the site in which the communication network is to operate; including possible sources of interference and attenuation which may disturb the communication network; introducing wireless devices that are to communicate in the communication network; including data regarding communication characteristics of the devices; testing and evaluating communication possibilities of the devices in the communication network taking into account the possible interference and attenuation sources; and if communication possibilities of a particular device are inadequate, suggesting adjustments regarding that device.

According to another aspect of the invention it is characterised in that the adjustments could comprise change of placement of the particular device, change of device and/or change of communication strategy. By communication strategy is meant the rate of transmission, emitted signal strength, radio frequency and physical orientation of the device and/or its antenna.

According to a further aspect of the invention, data regarding communication characteristics can comprise calculation of statistical probability of communication failure.

A main advantage of an engineering tool utilizing the method is that when a communication network is to be set up in for example a plant, mill, factory or offshore platform, a large part of the work can be done by simulation and/or in advance. By having the three dimensional layout, or topology of the plant to work on, including all possible interfering and attenuating equipment, machinery, building structures and the like and including the communication network with all the communicating devices in the topology, try out, testing and evaluating the different communicating devices in the specific environment that they are to operate is a task that saves a great deal of time. If the evaluation shows that a specific device does not function properly in the communication network, adjustments can be performed. The adjustments could then be to change the placement of that device in order to improve the quality of the communication. The adjustment could also be to change the device to another device better suited and/or to change communication strategy. Even though the aim is to have at least parts of the communication wireless, the evaluation may show that for some devices placed in certain areas of the plant, it is not feasible to have a wireless communication but instead have a wired part of the network for that device. It is an advantage that even such negative information may be obtained in advance of installation or engineering work on the plant.

For some of the devices it may be critical that the communication is not disturbed, such as for controlling fast and unstable processes, while for some devices delays and/or loss of data can be accepted, the method also includes the possibility of calculation of statistical probability of communication failure of the devices. In this way the method can provide information regarding the functional security of the different parts of the communication network.

This method shields the plant instrument engineer from the complexities of radio transmission theory so they can focus on the control and instrument engineering tasks.

These and other aspects of and advantages with the present invention will become apparent from the following detailed description and from the accompanying drawings.

BRIEF DESCRIPTION OF THE DRAWING

In the following detailed description of the invention, reference will be made to the accompanying drawings, wherein.

DETAILED DESCRIPTION OF THE INVENTION

The present invention relates to industrial process control systems and in particular implementation of wireless industrial process control systems.

The present invention comprises a engineering tool that helps the engineering of control systems which use wireless communication links. The engineering tool is based on computer software including inter alia a number of functions, calculation algorithms, iterating software, and stored data. The system tool is accessed via for example an ordinary computer having processing means, I/O devices and a graphical interface.

Figure 1:
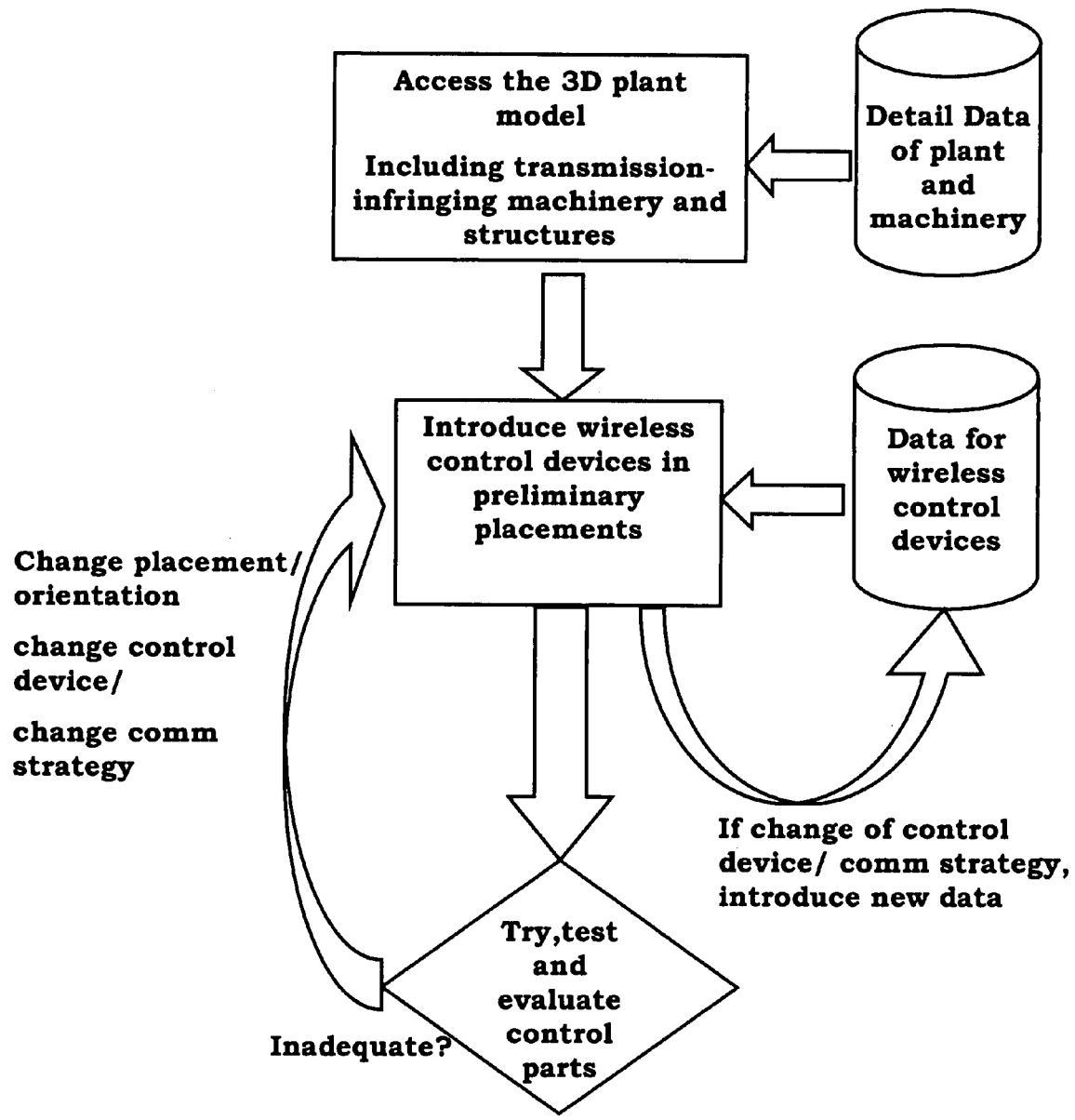
FIG. 1 shows the steps according to the present invention.

According to the flow of FIG. 1, first a 3D model of a plant or facility is created in a module of an existing engineering plant design software package. The 3D model comprises the machines and other equipment that is to be included in the plant and the spatial location of these, and includes the building structure. The model is typically also joined to a database of machines and equipment which store characteristics of these which are relevant to the propagation of radio transmission.

The characteristics that could affect the control system is interference from electromagnetic fields created by electrical motors, generators, high-voltage cables, welding equipment, ovens, electro-chemical equipment, other types of equipment or units using radio transmissions. Sources of radio transmission signal attenuation include line-of-sight obstructions due to, for example, structural features of the plant, including location of steel girders, thick walls, choice of materials of walls as well as the location of obstructing equipment and the occasional presence of humans on walkways. Metal in the structure is of particular importance in this regard, since metal blocks radio frequency signals and also reflects the signals, providing an uneven signal coverage.

Since there are many factors that will influence the wireless control system, the characteristics of the different parts of the plant that will affect the wireless control system need to be included in the database.

Once the 3D plant model is accessed, the next step in a typical plant engineering process is to introduce all the different control parts, such as field devices which are required to monitor and control the process of the plant. For each device type the engineer typically has access to manufacturer data listing all the different model types and their specifications. For each device model, there typically is a datasheet which describes properties, communication means and further features. This will enable an engineer working with the system tool to iteratively choose the most appropriate device model and device settings for the intended function and placement.

When the different devices are approximately placed in the structure of the plant, a fairly good overview is obtained regarding placement of communication nodes, hubs, links and the like for obtaining a communication network. It is now possible to have the system tool test, tryout and evaluate different field devices, nodes and links, different communication methods and strategy (such as more nodes, increase of output effect) and placement in that particular environment or zone of the plant, taking into consideration the possible interference from machines, equipment and building structure, in order to arrive at, and suggest, the best and most appropriate arrangement of communication between the field devices and the communication network. In this context it is to be understood that the system tool also is capable of suggesting wired communication should no wireless solution be able to provide the desired quality of communication. The evaluation of the communication system is done by the system tool, but the placement of the different devices, change of device/placement/communication strategy is preferably done by a skilled engineer.

Figure 2:
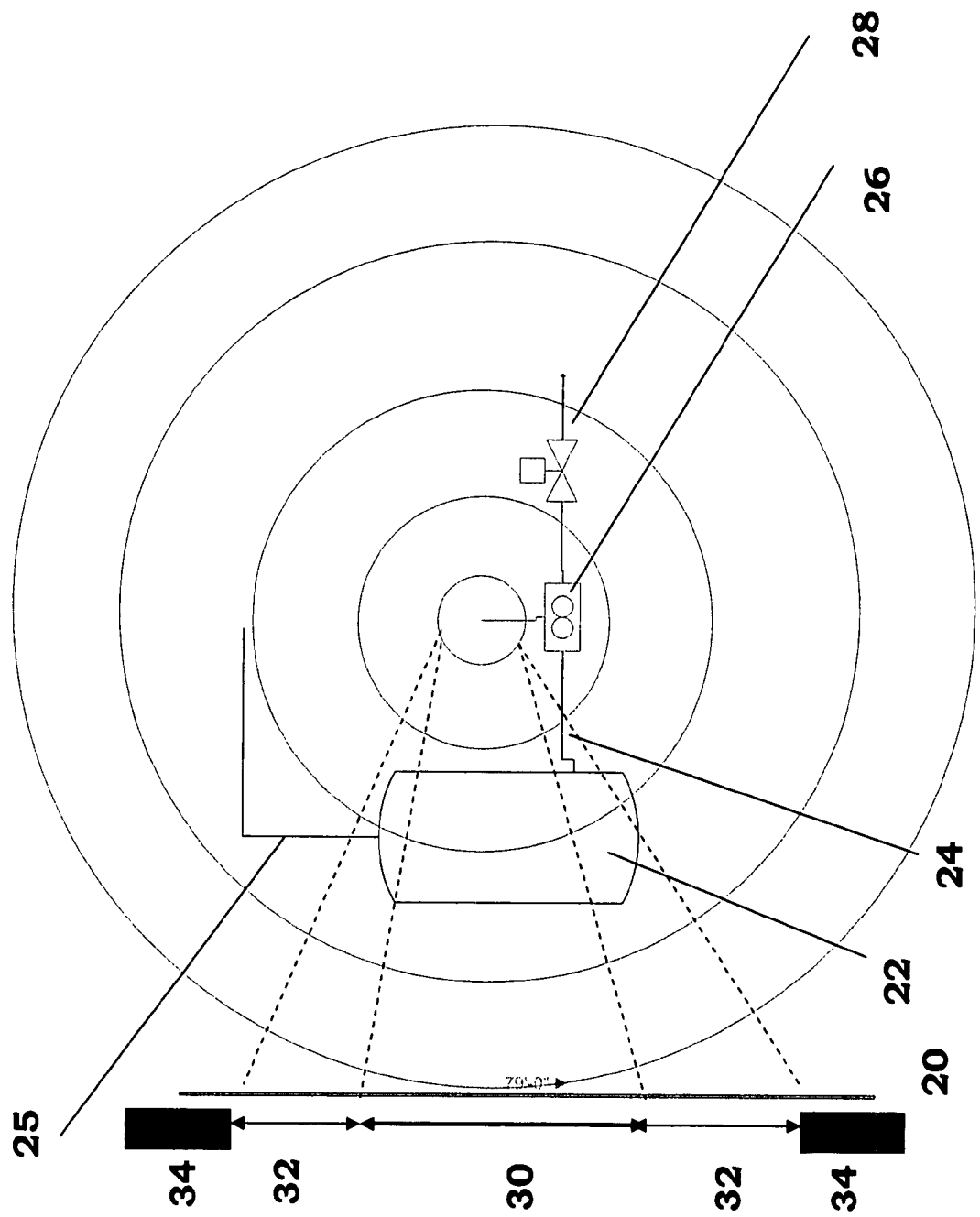
FIG. 2 shows how the method according to the present invention calculates the attenuation of the signal from a wireless field device due to the presence of an obstacle.

The diagram shown in FIG. 2 illustrates, in two dimensions for simplicity of explanation, how the method calculates the attenuation of the signal from a wireless flowmeter device 26 connected via an inlet pipe 24 and valve 28 to a water filled vessel 22. A transmitting/receiving device can be placed on a wall 20 but due to the presence of the vessel, the method takes this into account during calculation and then uses this calculation to indicate to the user the feasible wall-mounted locations for the wireless transmitting/receiving device. As seen in FIG. 2, the area 30 will not be suitable because of the vessel. Areas 32 are better but not optimal while the areas 34 will provide undisturbed wireless communication.

The test and evaluation part could also include a sort of ranking of the communication quality relative to the needs of the control task. For instance there could be some control tasks where it might be OK to have some delay or communication loss (e.g. for open loop applications), whereas for other cases it is very important that the communication must not be disturbed, such as for controlling fast and unstable processes.

In the case of safety-critical loops, the method can be used to calculate the safety integrity level (SIL) for any given arrangement and type/model of wireless device. The engineering user can use the methods iterative algorithm to introduce redundancies in the devices or communication links, or to change placement and distances such that the target SIL level is achieved.

The engineering tool can e.g. use data from an engineering system, such as distance between instruments, instrument types and model, instrument specification such as sampling rate, deadband, hysteresis and other parameters, intrinsic safety of tag/loop, level of tag/loop. Regarding the ranking of communication importance, the system tool could include calculation of statistical probability of failure.

The system tool thus performs evaluations of all parts of the wireless communication system and its interacting components and may also provide as a result a suggestion of a wireless communication network with all its components as well as data regarding possible risks of communication loss, a sort of rating.

The method and system tool according to the present invention may be implemented as software, hardware, or a combination thereof. A computer program product implementing the method or a part thereof comprises software or a computer program run on a general purpose or specially adapted computer, processor or microprocessor. The software includes computer program code elements or software code portions that make the computer perform the method. The program may be stored in whole or part, on, or in, one or more suitable computer readable media or data storage means such as a magnetic disk, CD-ROM or DVD disk, hard disk, magneto-optical memory storage means, in RAM or volatile memory, in ROM or flash memory, as firmware, or on a data server. Such a computer program product can also be supplied via a network, such as Internet.

It is to be understood that the above described embodiment of the present invention is to be regarded as a non-limiting example of the invention and that it may be modified in many ways within the scope of the patent claims.

The invention claimed is:

1. A method for designing an, at least partly wireless, local area communication network for industrial application, the method comprising:
   designing, by using a computer, a 3D model of a plant and equipment in the plant,
   introducing, by using a computer, into the 3D model of a plant and equipment in the plant wireless communication network devices including data regarding communication characteristics of the wireless communication network devices,
   identifying, by using a computer, utilizing the 3D model sources of interference and attenuation of a wireless signal of the wireless communication network devices due to other equipment and structures in the existing 3D model of the plant in advance prior to installation of the local area communication network,
   approximating, by using a computer, placement of wireless communication network devices in the existing 3D model of the plant utilizing the data regarding the communication characteristics of the wireless communication network devices in advance prior to installation of the local area communication network,
   utilizing, by using a computer, the 3D model and the data regarding the communication characteristics of the wireless communication network devices in advance prior to installation of the local area communication network in testing and evaluating wireless communication devices, connections among the wireless communication devices, communication methods, communication strategy and placement and orientation of the wireless communication network devices in the local area communication network taking into account interaction between the wireless communication network devices and the possible interference and attenuation sources due to equipment and structures other than the communication network and functioning of the wireless communication network devices in the 3D model of the plant including equipment, machinery and building structures,
   wherein said industrial application comprises a safety critical application wherein data regarding communication characteristics comprises calculation of statistical probability of communication failure resulting in a safety integrity level (SIL) value, and if the testing and evaluating utilizing the 3D model and the data regarding the communication characteristics of the wireless communication network devices indicates a communication possibility of a particular wireless communication network device is inadequate, carrying out in advance prior to installation of the communication network at least one of changing or making adjustments to a location or distance so that a target SIL is achieved, an orientation or an operation of the particular wireless communication network device, replacing the particular wireless device with another wireless communication network device, or changing the wireless communication network device to a wired communication network device.

2. The method according to claim 1, wherein the adjustments comprise change of communication network device type or model.

3. The method according to claim 1, wherein the wireless devices comprise field devices and communication enabling communication network devices.

4. The method according to claim 1, wherein the adjustments comprise a rate of transmission, emitted signal strength, radio frequency and physical orientation of the particular wireless device and/or its antenna.

5. The method according to claim 1, wherein the industrial environment comprises a plant, mill or factory.

6. A computer program product, comprising:
   a non-transitory computer readable medium; and computer program instructions recorded on the computer readable medium and executable by a processor for carrying out a method for designing an, at least partly wireless, local area communication network for industrial application, the method comprising
   designing a 3D model of a plant and equipment in the plant,
   introducing into the 3D model of a plant and equipment in the plant wireless communication network devices including data regarding communication characteristics of the wireless communication network devices,
   identifying utilizing the 3D model sources of interference and attenuation of a wireless signal of the wireless communication network devices due to other equipment and structures in the 3D model of the plant in advance prior to installation of the local area communication network,
   approximating placement of wireless communication network devices in the 3D model of the plant utilizing the data regarding the communication characteristics of the wireless communication network devices in advance prior to installation of the local area communication network,
   utilizing the 3D model and the data regarding the communication characteristics of the wireless communication network devices in advance prior to installation of the local area communication network in testing and evaluating wireless communication devices, connections among the wireless communication devices, communication methods, communication strategy and placement and orientation of the wireless communication network devices in the local area communication network taking into account interaction between the wireless communication network devices and the possible interference and attenuation sources due to equipment and structures other than the communication network and functioning of the wireless communication network devices in the 3D model of the plant including equipment, machinery and building structures,
   wherein said industrial application comprises a safety critical application wherein data regarding communication characteristics comprises calculation of statistical probability of communication failure resulting in a safety integrity level (SIL) value,
   and if the testing and evaluating utilizing the 3D model and the data regarding the communication characteristics of the wireless communication network devices indicates a communication possibility of a particular wireless communication network device is inadequate, carrying out in advance prior to installation of the communication network at least one of changing or making adjustments to a location or distance so that a target SIL is achieved, an orientation or an operation of the particular wireless communication network device, replacing the particular wireless device with another wireless communication network device, or changing the wireless communication network device to a wired communication network device.

7. The computer program product according to claim 6, wherein the computer program instructions are further for supplying the computer program instructions from the non-transitory computer readable medium via a network.

8. The computer program product according to claim 7, wherein the network for supplying the computer program instructions from the non-transitory computer readable medium is an internet.

9. A system for designing an, at least partly wireless, local area communication network for industrial application, the system comprising:

a module configured to create a 3D model of a plant and equipment in the plant, means for introducing wireless communication network devices and data regarding communication characteristics of the wireless communication network devices into the 3D model of a plant and equipment in the plant in advance prior to installation of the local area communication network, means for identifying utilizing the 3D model sources of interference and attenuation of a wireless signal of the wireless communication network devices due to other equipment and structures in the 3D model of the plant in advance prior to installation of the local area communication network, means for approximating placement of wireless communication network devices in the 3D model of the plant utilizing the data regarding the communication characteristics of the wireless communication network devices in advance prior to installation of the local area communication network, means utilizing the 3D model and the data regarding the communication characteristics of the wireless communication network devices in advance prior to installation of the local area communication network for testing and evaluating wireless communication devices, connections among the wireless communication devices, communication methods, communication strategy and placement and orientation of the wireless communication network devices in the local area communication network taking into account interaction between the wireless communication network devices and the possible interference and attenuation sources due to equipment and structures other than the communication network and functioning of the wireless communication network devices in the 3D model of the plant including equipment, machinery and building structures, and wherein said industrial application comprises a safety critical application wherein data regarding communication characteristics comprises calculation of statistical probability of communication failure resulting in a safety integrity level (SIL) value, if the testing and evaluating utilizing the 3D model and the data regarding the communication characteristics of the wireless communication network devices indicates a communication possibility of a particular wireless communication network device is inadequate, means for suggesting adjustments regarding the particular wireless communication network device in advance prior to installation of the communication network, such adjustments comprising adjustments to a location or distance so that a target SIL is achieved.

10. The system according to claim 9, wherein the communication elements of the wireless communication network devices comprise connections among the wireless communication devices, communication methods, communication strategy and placement and orientation of the wireless communication network devices.

11. A method for designing an, at least partly wireless, local area communication network for industrial application, the method comprising:

designing, by using a computer, a 3D model of a plant and equipment in the plant, introducing, by using a computer, into the 3D model of a local area network arranged in an industrial environment wireless communication network devices and data regarding communication characteristics of the wireless communication network devices, identifying, by using a computer, utilizing the 3D model sources of interference and attenuation of a wireless signal of the wireless communication network devices, calculating the attenuation of the wireless signal due to other equipment, machines and structural features of the plant in the 3D model of the plant in advance prior to installation of the local area communication network, approximating, by using a computer, placement of wireless communication network devices in the 3D model of the plant utilizing the data regarding the communication characteristics of the wireless communication network devices in advance prior to installation of the local area communication network, utilizing, by using a computer, the 3D model and the data regarding the communication characteristics of the wireless communication network devices in advance prior to installation of the local area communication network in testing and evaluating communication elements of the wireless communication network devices with the local area communication network taking into account interaction between the wireless communication network devices and the possible interference and attenuation sources due to equipment, machines and structural features of the plant other than the communication network and functioning of the wireless communication network devices in the 3D model of the plant including equipment, machinery and building structures, wherein said industrial application comprises a safety critical application wherein data regarding communication characteristics comprises calculation of statistical probability of communication failure resulting in a safety integrity level (SIL) value, and if the testing and evaluating utilizing the 3D model and the data regarding the communication characteristics of the wireless communication network devices indicates a communication possibilities of a particular wireless communication network device is inadequate, suggesting adjustments regarding the particular wireless communication network device in advance prior to installation of the communication network, such adjustments comprising adjustments to a location or distance so that a target SIL is achieved.

12. The method according to claim 11, wherein the communication elements of the wireless communication network devices comprise connections among the wireless communication devices, communication methods, communication strategy and placement and orientation of the wireless communication network devices.

* * * * *